United States Patent

Turner

[15] 3,663,056
[45] May 16, 1972

[54] VEHICLE SEAT FRAMES AND MECHANISMS

[72] Inventor: Harold Roy Turner, Walsall, England
[73] Assignee: H. R. Turner (Willenhall) Limited, Walsall, England
[22] Filed: Sept. 2, 1969
[21] Appl. No.: 854,619

[30] Foreign Application Priority Data

June 8, 1968  Great Britain......................27,360/68

[52] U.S. Cl....................................................297/369
[51] Int. Cl...........................................A47c 3/00, B60n 1/02
[58] Field of Search..............................297/353, 366–372, 297/357; 5/74

[56] References Cited

UNITED STATES PATENTS

| | | | |
|---|---|---|---|
| 2,712,345 | 7/1953 | Borisch | 297/369 |
| 2,941,583 | 6/1960 | Tischler et al. | 297/369 |
| 3,051,526 | 8/1962 | Werner et al. | 297/367 |
| 2,546,834 | 3/1951 | Pfau | 297/366 |
| 1,182,855 | 5/1916 | Poler | 297/357 |

FOREIGN PATENTS OR APPLICATIONS

| | | | |
|---|---|---|---|
| 1,376,806 | 10/1963 | France | 297/367 |
| 963,754 | 5/1957 | Germany | 297/369 |
| 1,187,870 | 4/1970 | Great Britain | 297/366 |

*Primary Examiner*—Paul R. Gilliam
*Attorney*—Kurt Kelman

[57] ABSTRACT

The invention provides a mechanism for adjusting the angle of the seat back to the seat base in which toothed members are provided on parts secured to the seat back and seat base at both sides of the seat, and in disengaging the teeth for angular adjustment one plate at each side is lifted bodily with respect to the other plate at each side to take the teeth out of mesh.

5 Claims, 8 Drawing Figures

PATENTED MAY 16 1972
3,663,056
SHEET 1 OF 4
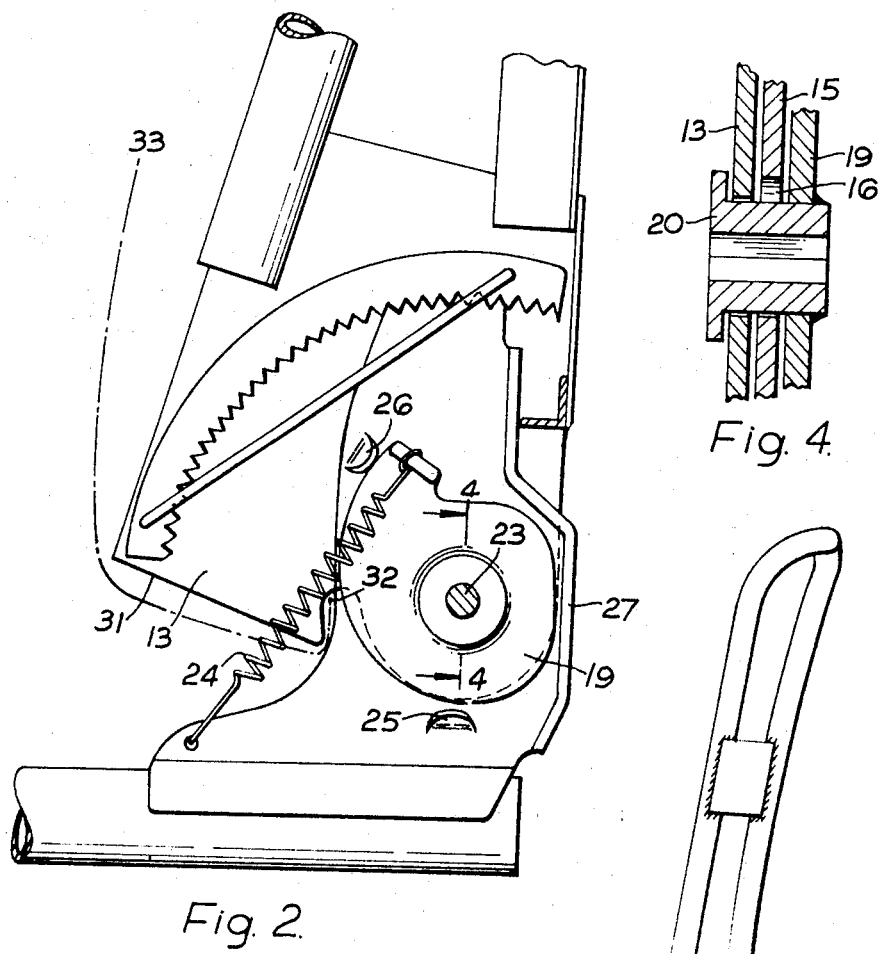
Fig. 4.
Fig. 2.
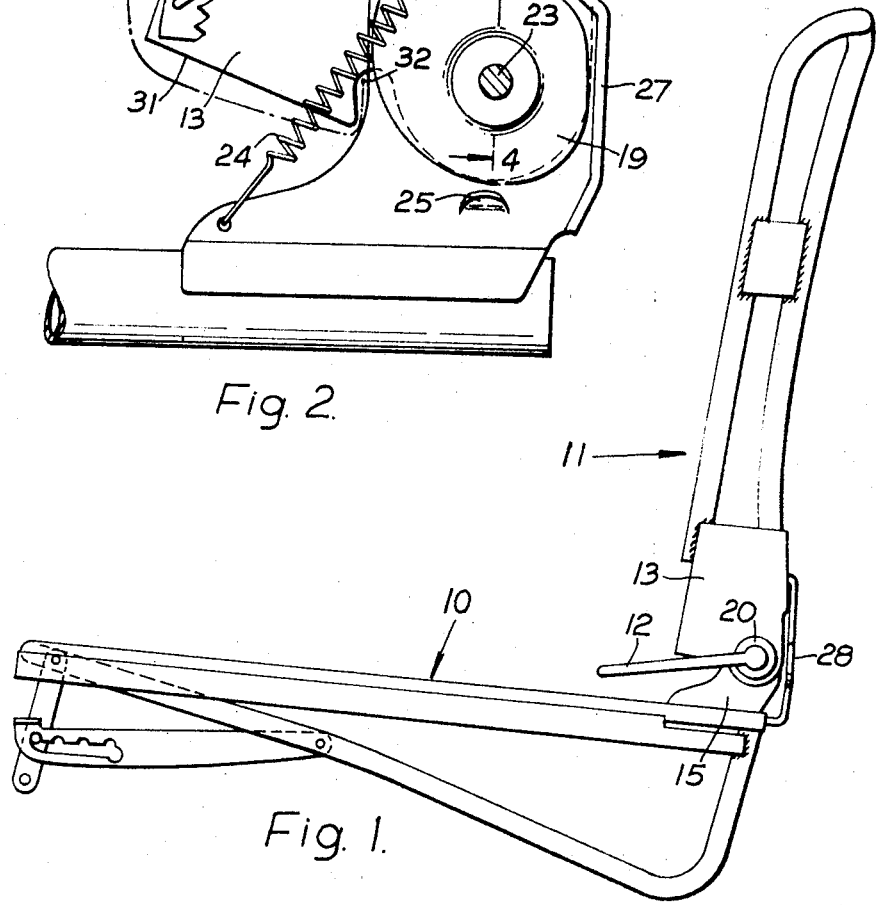
Fig. 1.
INVENTOR
HAROLD R. TURNER
By *[signature]*
AGENT

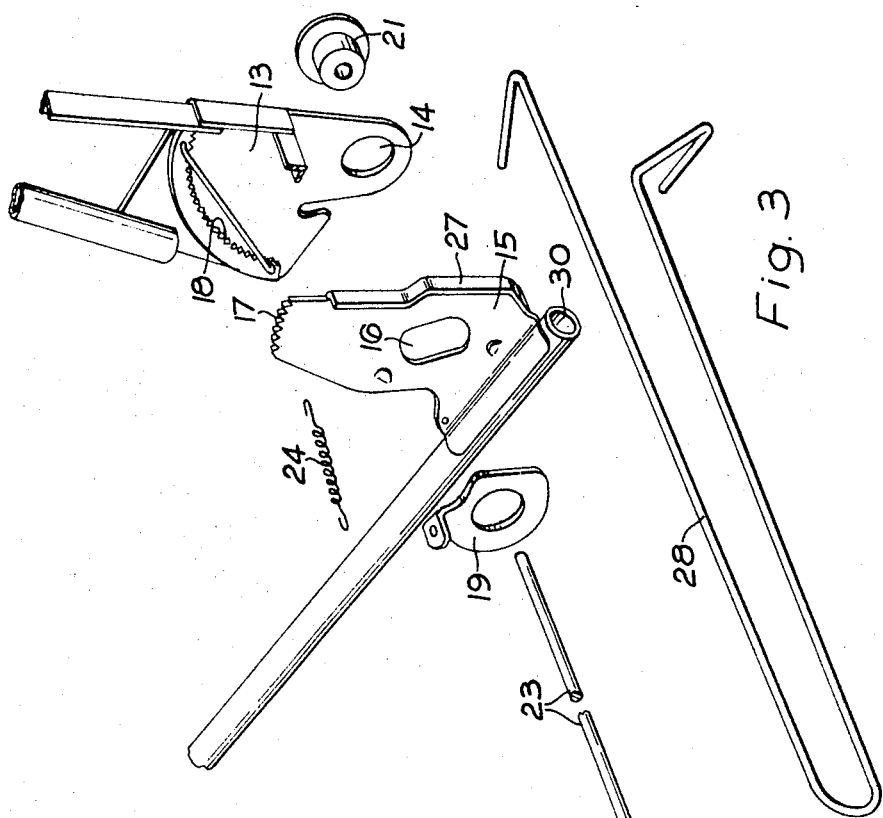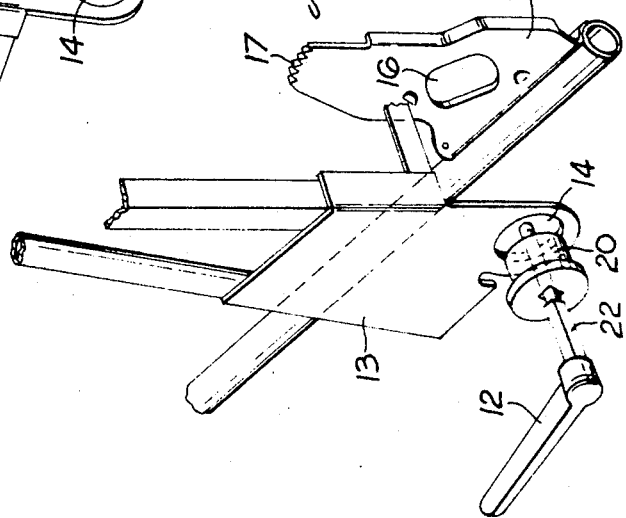

VEHICLE SEAT FRAMES AND MECHANISMS

This invention relates to vehicle seat frames and mechanisms and is an improvement over the invention described in our co-pending patent application No. 16930/67 which describes and claims a seat frame or mechanism having as a particular feature, a relatively massive tube running along the hinge axis and connecting opposite sides of the back rest or seat base; the mechanism actually described and claimed includes toothed members on each of two plates, one attached to the back rest and the other to the seat base, and a rotary cam which lifts the one toothed plate and takes the teeth out of mesh. In this action the tube lifts, and the plate through which it extends and to which it has relative movement, has an elongated slot to allow this lifting. In a so-called single-sided mechanism, the tube is journalled at one end opposite to the end associated with the toothed plates. In a double-sided mechanism both pairs of plates (since a pair if provided at each side whether or not teeth are provided at each side of the seat) have one with an elongated slot to allow tube movement. Hence the tube is lifted bodily or is merely tilted about an axis at one end.

The present invention avoids the use of said tube.

In accordance with one aspect of the present invention, a seat mechanism for adjusting the angle of the back rest relative to the seat base, comprises a pair of plates secured respectively to the back rest and base, and each carrying teeth which may mesh to hold the parts fast together the plates being pivoted on a common hub which extends through an aperture in one plate, and through an elongated slot in the other plate, and a cam rotatable about the hub axis and co-operating with an abutment on the slotted plate for causing relative displacement of one plate transverse to the hub axis when the cam is turned.

In accordance with another aspect of the invention, a seat mechanism has a pair of plates pivotally secured together at each side of the seat, one plate of each pair being attached to the seat base and the other to the seat back, the latter projecting forwardly beyond the said one plate and having a lower edge exposed. This enables trim to be applied to the back rest in an easy and convenient manner, to extend across the back rest, beyond the sides of the seat and across the rear face of the back rest, and include a portion across the lower edge of the back rest, without providing complicated slots to clear the seat base plates, and to hide the mechanism completely.

The inventions are illustrated in the drawings accompanying the provisional specification wherein:

FIG. 1 is a side elevation of a seat frame ready for trimming;

FIG. 2 is an enlarged elevation of a portion showing one mechanism;

FIG. 3 is an exploded perspective view of the mechanism;

FIG. 4 is a section on the line 4—4 FIG. 2;

FIG. 5 is a view similar to FIG. 3, of one part only, showing the side hidden from view in that Figure;

Figure 6:
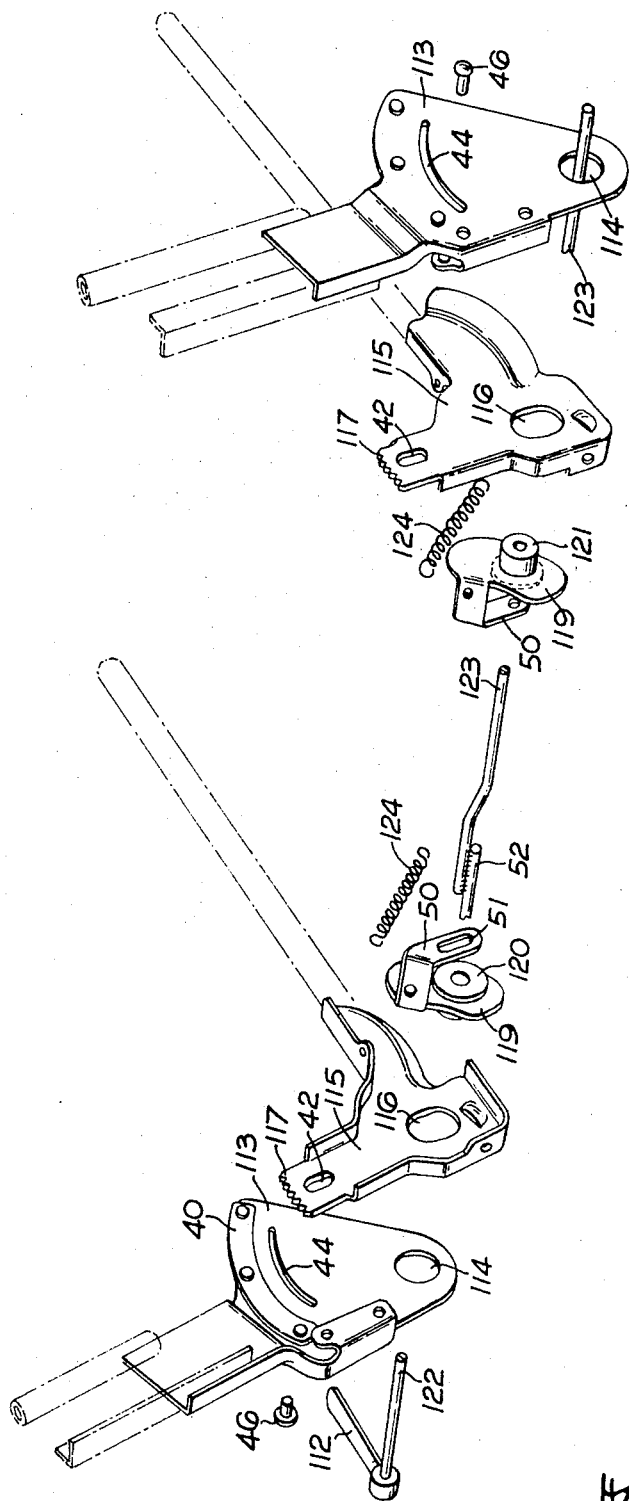
Figure 7:
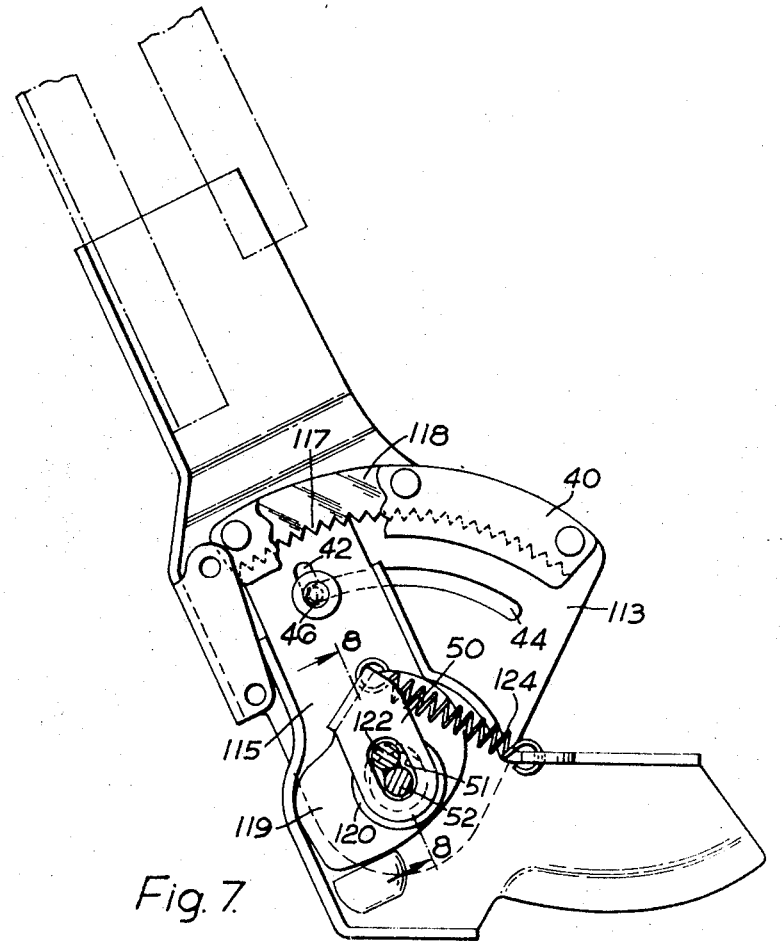

Further, the invention in accordance with another embodiment is illustrated in the accompanying drawings wherein:

FIG. 6 is an exploded perspective view;

FIG. 7 is an elevation partly in section; and

Figure 8:
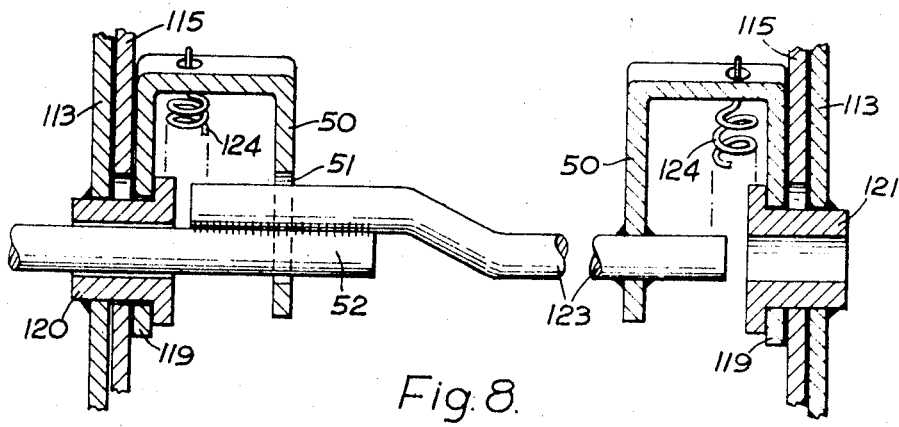

FIG. 8 is a sectional rear elevation.

Referring first to FIGS. 1 – 5, the complete seat frame comprises a seat base frame 10 and a seat back frame 11, and a mechanism is provided at each side of the seat, at the rear thereof for hinging the two frames together and controlling angular adjustment thereof.

One mechanism comprises plate 13 fixed to the back rest and having a circular journal hole 14, and plate 15 fixed to the seat base and having an elongated slot 16. Plate 15 has teeth 17 formed directly thereon or fast therewith, and plate 13 has like teeth 18. The latter extend in an arc concentric about the axis of hole 14, and the teeth 17 are in an arc concentric about an axis of a semi-circular portion at one end of slot 16. Slot 16 is of the shape generated by moving a circle (containing said semi-circular) in a straight line.

Plates 13, 15 are journalled on bush 20, which is cylindrical. Hence the back rest can turn relative to the seat base on the bush, and move radially of the bush relative to the seat base. In one radial extreme position, the two sets of teeth mesh as shown in FIG. 2, and to permit turning, the seat back has to be lifted to the other radial position.

Fast with the bush is cam 19, and handle 12 is connected to square spindle 22 which engages a like bore in the bush, so that the bush and cam can be turned together. The spindle has an extension projecting towards the other side of the seat.

Plate 15 has reaction abutments 25, 26 and anchors spring 24 which turns the cam to the position illustrated in FIG. 2. Displacement, i.e. lifting of the handle 12, turns the cam so that a lobe of the same contacts abutment 25 and displaces the plate 15 relative to the bush and lifts teeth 18 off teeth 17, to free the mechanism for turning.

Release of the handle allows the seat back to drop by gravity to re-mesh the teeth, and although the cam may turn via the reaction abutment 26, the spring assists in restoration.

The mechanism on the other side of the seat is similar, but is linked to the common handle by rod 23 welded to bush 21 at that side, and to the spindle 22 extension at the handle side.

Torsion bar spring 28 is U-shaped and has one tail engaged in a clip bore 29 on the plate 13, and the other in a tube 30 of the seat base, and this spring urges the seat back to a vertical position.

Plate 15 is reinforced by an edge flange 27 which also forms a cam reaction abutment.

For ease of trimming in the upholstery of the frame, plates 13 have a lower edge 31 which terminates in an upwardly extending slot 32, and this allows a pre-formed panel of fabric to extend along the chain dot line 33 and terminate at slot 32, giving a heat appearance and simplifying assembly.

The mechanism shown in FIGS. 6 – 8 are generally similar, but omit the slot 32, and the parts thereof are indicated by the reference numbers as used in the description of FIGS. 1 – 5 with 100 added: plate 113 is modified by the addition of a curved plate 40 over the teeth 118 and which projects below those teeth. Teeth 117 extend between the plate 40 and the plate 113 per se and this arrangement shields the teeth and prevents ingress of dirt and grit to the intertooth recesses.

Moreover, plate 115 has an elongated slot 42 closely adjacent to teeth 117, and plate 113 an arcuate slot 44 concentric with its teeth, and a rivet or bolt 46 extends through the slots, and permits both angular adjustment and radial movement in meshing, but holds teeth 117 in the same plane as teeth 116 even under severe deflection of the respective seat frames. Moreover, slot 44 limits the angle of adjustment and prevents teeth 117 moving beyond teeth 118.

The cams 119 are modified by the addition of a limb 50 in the one case having an elongated slot 51 into which the end 52 of spindle 122 extends, the squared portion being omitted, and said end 52 is welded to rod 123, the end of which also lies in the slot. With the other cam, the rod is welded direct to the limb. The effect of this is that the handle 112 is directly coupled to one cam but is coupled to the other cam at the handle side of the seat via the slot 51, and there is sufficient free play between the slot and the rod and spindle to allow slightly independent action of the two mechanisms, so that the two can re-mesh separately. Hence if the seat back is distorted, one side may re-mesh after adjustment, but the other be prevented from so doing because the teeth are out of mesh. When the distortion is released, the second side will re-mesh.

The invention may be employed in a single-sided mechanism, using a plain hinge at one side of the seat.

I claim:

1. A mechanism for adjusting the angle of a back rest of a seat relative to the seat base, comprising: a pair of plates secured to said back rest and said seat base respectively, each of said plates having co-operatively meshing teeth adapted, under the weight of said back rest to engage and hold said plates together, one of said plates having a circular aperture and the other of said plates having a radial slot extending upwardly and forwardly with said seat and aligned with the aperture and extending transversely to said teeth, a hub extending through said aperture and said slot about which said plates are adapted to pivot, a cam rotatable about the axis of said hub, said cam fixed to said hub, abutment means formed on one of said plates co-operating with said cam, said abutment means secured to said radially slotted plate, and means for rotating said cam against said abutment to relatively displace one plate transverse to the hub axis relative to the other plate, thus causing said teeth to disengage and allowing relative angular movement between said back rest and said seat base, and bolt means, interconnecting said plates, said bolt means extending through a slot in the other plate radial to said hub axis, whereby the angular displacement of said plates is limited by the dimensions of said slots.

2. The seat mechanism of claim 1 wherein a lever handle is included and coupled to said hub for rotation of said cam.

3. The seat mechanism of claim 2, wherein the plate secured to said back rest has teeth projecting toward the axis of said hub, and said cam is adapted to raise said plate and said seat base to thereby disengage said meshing teeth.

4. A seat including a pair of seat mechanisms according to claim 1 located respectively at each end of said seat, and a rod extending between the hubs of each of said mechanisms, said rod being operatively connected to at least one of said hubs.

5. The seat of claim 3, wherein one end of said rod is operatively connected to its associated hub and the other end is freely rotatable within its associated hub.

* * * * *